United States Patent Office 3,091,597
Patented May 28, 1963

3,091,597
COMPOSITIONS OF VINYL CHLORIDE HOMO-
POLYMERS AND VINYL CHLORIDE-VINYL
ACETATE COPOLYMERS
Harry P. Henriques III, Warren Township, Somerset
County, N.J., assignor to Union Carbide Corporation,
a corporation of New York
No Drawing. Filed Dec. 1, 1958, Ser. No. 777,202
10 Claims. (Cl. 260—31.4)

This invention relates to improved vinyl chloride resin compositions. More specifically, this invention relates to improved vinyl chloride resin compositions which have particular utility in the manufacture of resilient, flexible, smooth-surfaced vinyl coverings for floors, walls and the like.

Vinyl coverings, for example vinyl floor tiles, based on vinyl chloride resin compositions, have ageing characteristics, i.e. retain their resiliency and flexibility on ageing, alkali resistance, and color and abrasion resistance which are superior to linoleum type coverings. Consequently, vinyl coverings are in increased demand and are becoming the coverings of choice, replacing linoleum and other similar type coverings based on oleo-resinous binders such as oxidized linseed oil.

The increased demand for vinyl type coverings has posed a serious economic problem to the manufacturers of linoleum and similar type surface coverings in that linoleum manufacturers are not able to process vinyl chloride resin compositions of hitherto known formulation into surface coverings in equipment designed for the manufacture of linoleum.

It has been found for example, that calenders which are used to form flat linoleum surface coverings and which normally have two calender rolls cannot withstand the roll-separating force, that is, the total force exerted by the composition against the calender rolls, developed by conventional vinyl chloride resin compositions as these compositions are passed through the calender rolls and formed into sheet material. Furthermore, maximum temperatures attainable on equipment designed for linoleum manufacture such as the calender rolls previously mentioned are generally not high enough for the successful processing of hitherto known vinyl chloride resin compositions into suitable surface coverings. Equipment which is suitable for the manufacture of linoleum type coverings, therefore, is rapidly becoming obsolete as the demand for linoleum decreases and the demand for vinyl surface coverings increases.

The compositions of the present invention, however, based on vinyl chloride resins, can be processed into high quality, flexible, smooth-surfaced, resilient, homogeneous surface coverings of any desired thickness in equipment designed for the manufacture of linoleum type coverings. Compositions of this invention can be calendered into smooth, thick sheets, on the order of 0.125 of an inch and thicker, by a single pass through a standard two-roll linoleum calender at temperatures readily attainable in these calenders and without exceeding the total roll separating force limit thereof.

Moreover, the vinyl chloride resin compositions of this invention are also particularly desirable inasmuch as surface coverings made therefrom do not require a costly post-calendering, press-planishing operation in order to impart a smooth, glossy surface finish to the product. A post-calendering press planishing operation involves removing the formed sheets from the calender rolls, cutting the sheets into convenient sizes and compacting and heating the sheets in a heavy press in order to provide the sheet material with a suitable finish.

The compositions of this invention comprise vinyl chloride resins having a specific viscosity of between about 0.080 and 0.150 in admixture with a stabilizer and plasticizer in amounts such that the compositions have a total roll separating force of less than about 9000 lbs. and when processed into flat surface coverings, a residual indentation of less than about 10.5% and a McBurney indentation of from about 10 to about 25 mils.

The specific viscosity determination of the vinyl chloride resins was conducted on samples of 0.2 gram of resin dissolved in 100 ml. of nitrobenzene. The specific viscosity tests were carried out at 20° C. and the data obtained used to determine the specific viscosity according to the formula:

$$\text{Specific viscosity} = \frac{T-T'}{T'}$$

wherein: T' is the time for a measured amount of nitrobenzene to pass through a capillary orifice; T is the time for the same amount of resin solution to pass through the same orifice. The capillary orifice was of a size sufficient to provide an efflux time for the nitrobenezne solvent of about 100 seconds.

Residual indentation of surface coverings manufactured from the compositions of this invention was determined by the method described in Federal Specification (F.S.) L–T–751 with the exception that 10 samples were tested instead of two and the average residual indentation of the 10 samples noted. The test is conducted by placing a flat 0.178 inch diameter circular steel foot on a surface covering having a thickness of ⅛ of an inch and applying an indentive load of 80 lbs. onto the surface covering for a period of 10 minutes through the steel foot. Data for the determination of the residual indentation was obtained from the indentation remaining one hour after removal of the 80 lbs. load. Residual indentation was calculated according to the formula:

Residual indentation = 100

$\times \dfrac{\text{indentation remaining after recovery time of 1 hour}}{\text{Thickness of covering}}$ A surface covering having a residual indentation in excess of about 10.5% is generally unsatisfactory as it retains unsightly indentation marks.

The McBurney indentation test is a measure of the hardness of a surface covering. A surface covering having a McBurney indentation, in mils, of less than about 10 is generally too stiff. A covering having a McBurney indentation value in excess of about 25 mils is generally too soft and flexible for practical use. The McBurney indentation test is conducted according to Federal Specification (F.S.) L–T–751. This test is conducted by applying a two lbs. load to a surface covering of ⅛ inch thick through a hemispherical foot having a diameter of ¼ of an inch. A zero reading, in mils, is taken when the two pound load is applied. An additional load of 28 lbs. is then added and a second reading is taken one minute after the 30 lbs. load has been applied. A third reading is taken 10 minutes after the 30 lbs. load has been applied. The McBurney indentation is calculated according to the formula:

McBurney indentation=Reading after one minute—zero reading (in mils)

The same formula is used to calculate the McBurney indentation after the 30 lbs. load has been applied for 10 minutes.

The method of measuring the total roll separating force developed by the compositions of this invention was conducted as follows: the measurements were made on a two-roll test mill wherein the peripheral speed of the front roll and rear roll was the same. Each roll was rotated by a shaft which passed through its center. Two so-called take-up screws bore directly against and restrained the bearing blocks which housed the rotating shaft of the front roll. By proper manipulation of the take-up screws the clearance opening between the rear roll and front roll was adjusted and fixed as desired. The take-up screws were of a special configuration wherein the far end of the shank of each screw, i.e. the end which bore against the bearing blocks, had a reduced cross section. Four strain gages were cemented to each take-up screw at the far end of the shank and connected in a bridge circuit to a potentiometer. The potentiometer recorded the change in resistance of the strain gages due to the strain on the take-up screws. The change in resistance recorded by the potentiometer is commonly referred to as the "load reading." Two strain gages were located axially on reverse sides of each screw shank and compensated for any bending of the screw shank. Two other strain gages were mounted around the circumference of the shank of each take-up screw and acted as temperature compensators.

The circuit was balanced by the use of external resistors, and the potentiometer recorded the change in resistance due to strain on the take-up screws. By means of a selector switch, it is possible to measure the strain on each screw individually of the total strain on both of the take-up screws. The take-up screws were calibrated on a tensile testing machine prior to installation on the test mill. A test mill wherein both front and rear rolls had a diameter of 8 inches, a length of 14.4 inches, a peripheral speed of 53.6 feet per minute and wherein the clearance opening between rolls was 0.040 of an inch was used to obtain the total roll-separating force values noted in this specification. The surface temperature of the front roll of the test mill was 130° C. The surfec temperature of the rear roll was 90° C. The test procedure consists in fluxing about 750 grams of a preblend of a composition to be tested, on another two-roll mill, into the form of a sheet having a thickness greater than the clearance opening between the rolls of the test mill. The preblend was prepared by dry blending the composition for 10 minutes in a 10-quart Hobart paddle mixer. Once the composition is formed into a sheet, it is then transferred to and banded about the front roll of the test mill. The change in resistance due to the strain on each screw, i.e., the so-called "load reading" is read off the potentiometer after the composition has been on the test mill for five minutes. The total roll-separating force is the sum of the "load readings" on the two take-up screws.

The compositions of the present invention have a total roll-separating force of less than about 9000 lbs.

A composition having a total roll-separating force of less than about 9000 lbs., as tested by the method previously described, can be successfully processed into flat surface coverings having a standard thickness of about 0.025 to about 0.125 inch at speeds of about 10 to about 100 feet per minute on conventional linoleum calenders without exceeding the total roll-separating force limit of such calenders.

By the term "vinyl chloride resin" as used herein is meant vinyl chloride homopolymers, vinyl chloride-vinyl acetate copolymers and mixtures thereof wherein the resin or the composite resin made up of mixtures of two or more vinyl chloride resins has a vinyl chloride content polymerized therein of at least about 86 percent by weight and a specific viscosity of from about 0.080 to about 0.150. Vinyl chloride resins having a vinyl chloride content polymerized therein of from about 88 to about 96 percent by weight and a specific viscosity of from about 0.085 to about 0.140 are particularly preferred for purposes of this invention. Compositions containing a vinyl chloride resin having a vinyl chloride content of about 88 to about 96 percent by weight and a specific viscosity of from about 0.085 to about 0.140 are more easily processed into surface coverings and the surface coverings produced have excellent surface characteristics and excellent resiliency.

Stabilizers and plasticizers, as previously stated, are added to the vinyl chloride resins to produce compositions which are suitable for purposes of this invention. If desired, inert finely-divided, inorganic fillers can also be added to the compositions of the present invention.

Suitable compositions are those containing from about 15 to about 70 percent by weight vinyl chloride resin; from about 10 to about 30 percent by weight of a plasticizer for the vinyl chloride resin; from about 0.2 to about 5 percent by weight of a stabilizer for the vinyl chloride resin; and from 0 to about 75 percent by weight of an inert, finely-divided inorganic filler wherein the components are present in amounts such that the compositions have a total roll-separating force of less than about 9000 lbs. and when processed into flat-surface coverings have a residual indentation of less than about 10.5 percent and a McBurney indentation of from about 10 to about 25 mils.

Particularly desirable compositions, especially from an economic standpoint, are those containing from about 20 to about 40 percent by weight vinyl chloride resin; from about 10 to about 15 percent by weight plasticizer; about 0.5 to about 2 percent by weight stabilizer; and from about 45 to about 70 percent by weight inert, finely-divided, inorganic filler wherein the components are present in amounts such that the compositions have a total separating force, and when processed into sheet material, the residual indentation and McBurney indentation previously noted. Amounts in percent by weight are based on the total weight of the compositions.

Illustrative of stabilizers for vinyl chloride resins, improving the resistance of vinyl chloride resins to the deleterious effects of light, oxygen, heat and the like, are the so-called "acid acceptor" compounds which are capable of reacting with and neutralizing any hydrogen chloride which might split off from the vinyl chloride resin. Among "acid acceptor" compounds are the compounds of metals of the second and fourth groups of the periodic table such as the basic lead salts, tin compounds, barium salts of organic acids and the alkaline earth metal salts of weak organic acids having from 4 to 18 carbon atoms. Specific compounds include the following: dibasic lead stearate, lead orthosilicate, coprecipitated lead orthosilicate and silica gel, normal lead salicylate, monohydrous tribasic lead maleate, phenoxy lead undecylate, phenoxy lead stearate, toloxy lead oleate, phenoxy lead oleate, phenoxy lead ricinoleate, xyloxy lead stearate, xyloxy lead palmitate, chlorophenoxy lead undecylate, chloro-toloxy lead oleate, naphthoxy lead palmitate, naphthoxy lead linoleate, xyloxy lead montanate, toloxy lead hypogeate, phenoxy lead carnaubate, barium ricinoleate, barium ricinoleate modified with 2-ethyl hexanoic acid, dibasic lead carbonate, sodium citrate, monohydrous tribasic lead sulphate, dibasic lead phosphate, dibasic lead phthalate, dibutyl tin dilaurate, butyl tin s,s',s''-tris(mercaptoacetic acid), cadmium naphthenate, dibutyl tin diacetate, basic lead hydroxylnaphthenate, various organic strontium salts such as strontium naphthenate, certain sodium organo phosphate compositions known as "Vanstay" (chemical analysis: 16.67% Na, 8.33% P, 49.12% ash); and also certain boron compounds such as Stabelon A (chemical analysis: 9.17% Na; 5.21% B; 3.59% P; 7.78% Ca; 53.33% ash), zinc 2-ethyl hexoate, calcium stearate, sodium sorbate and the like.

Other stabilizers include epoxidized soybean oil, epoxidized butyl stearate, epoxidized pentyl stearate, epoxidized hexyl stearate, epoxidized heptyl stearate, epoxidized octyl stearate, cyclohexyl epoxy stearate, benzyl epoxy stearate, phenyl epoxy stearate, 2-acetoxyethyl 9,10-epoxy-12 acetooxyoctadecanoate, 2-propionyloxyethyl 9, 10-epoxy-11-acetooxyoctadecanoate, diglycidyl ether of 2,2-bis(p-hydroxyphenyl)propane and other such epoxy compounds, pentaeryltritol and derivatives thereof such as dipentaerythritol, disphenols such as 2,2-bis(4-hydroxyphenyl)propane, hindered phenols such as the 2,4,6-trialkyl substituted phenols and 2,2'-methylene bis-4,6-dialkyl phenols. Illustrative of the hindered phenols can be mentioned 2,4,6-tri-tert-butyl phenol, 2,6-di-tert-butyl-4-methyl phenol, 2,2'-methylene bis(4,6-di-tert-butyl phenol) and the like.

Stabilizers can be used singly or in combination of two or more.

Plasticizers which can be added to the compositions of this invention include, among others, the monomeric ester plasticizers such as obtained from the reaction of a carboxylic acid and an alcohol, particularly a branched chain alcohol having from 4 to 12 carbon atoms. Among the polycarboxylic acids which can be used to react with polyhydric alcohols to produce monomeric ester plasticizers are oxalic, malonic, succinic, glutaric, sebacic, adipic, pimelic, suberic, azelaic, tricarballylic, citric, tartaric and butane tricarboxylic acid. Unsaturated polycarboxylic acids which can be used include maleic, fumaric, itaconic and citraconic. Phthalic, tetrahydrophthalic, tetrachlorophthalic, terephthalic and isophthalic acids can also be used. Mono-basic acids which can be used to react with the mono-hydric alcohols are butyric, caproic, caprylic, capric, lauric, myristic, palmitic, stearic, and oleic and also phosphoric, carbonic, glycolic and decanoic acids. These acids, comparable acids and their anhydrides can also be used either singly or in combination with one another.

The alcohols which are suitable for reaction with the aforementioned acids and acid anhydrides include among others the following: propylene glycol, ethylene glycol, butyleneglycol, pinacol, trimethylol propane, mannitol, dulcitol, sorbitol, pentaerythritol, dipentaerythritol, 2-ethyl hexyl alcohol, 2-ethylhexane-1,3 diol, isooctyl alcohol, isoheptyl alcohol, isononyl alcohol, isodecyl alcohol, triisooctyl alcohol, isotridecyl alcohol, 2-propyl-4-methylpentyl alcohol, 2-propyl-heptyl alcohol, n-butanol, n-octanol-2, benzyl alcohol, phenol, cresols and the synthetic alcohols produced by the well-known "Oxo" process. The alcohols can be used singly or in combination with one another.

A description of the "Oxo" process can be found in U.S. Patent 2,327,066 and in the U.S. Bureau of Mine's Publication "R1 4270" Critical Review of Chemistry of the Oxo Synthesis (1948). Description of various typical esters derived from the "Oxo" alcohols and the preparation of these esters can be found in U.S. Patent 2,625,527.

Illustrative of specific monomeric esters which can be used to plasticize vinyl chloride resins include diisooctyl sebacate, dioctyl phthalate, dipropylene glycol benzoate, diisooctyl azelate, diisoheptyl sebacate, diisononyl adipate, diisooctyl tetrahydrophthalate, triisooctyl aconitate, triisooctyl phosphate, tricresyl phosphate, diisodecyl glycolate, diisooctyl adipate, diisoheptyl phthalate, diisononyl phthalate, triisooctyl tricarballylate, diisotridecyl maleate, diisotridecyl carbonate, diisotridecyl oxalate, isotridecyl laurate, isotridecyl isotridecanoate, 2-ethyl hexyl "Oxo" decyl phthalate, di-"Oxo" decyl phthalate, and 2-ethylhexane-1,3 diol adipate. The alcohols used in preparing 2-ethyl hexyl "Oxo" decyl phthalate and di-"Oxo" decyl phthalate were produced by the "Oxo" process.

Other monomeric plasticizers include: sulfonyl bis-alkyl acetate, trialkyl-1-benzoyl propane-2,3,4-tricarboxylate, hydrogenated methl abietate, adducts resulting from the reaction of dialkyl succinate such as diethyl succinate with a dialkyl fumarate such as diethyl fumarate, dialkylaryl carboxyhydrocinnamates such as bis-(2-ethyl hexyl) p-carboxydihydrocinnamate, 4-alkyl sulfonyl morphalene, and the like.

Polymeric plasticizers such as the linear polyester plasticizers can also be added to the vinyl resin compositions of the present invention. Polyester plasticizers can be produced by reacting aliphatic diols having from 2 to 12 carbon atoms with dibasic acids also having from 2 to 12 carbon atoms. Among the polybasic acids which can be used to react with the polyhydric alcohols are oxalic, malonic, succinic, glutaric, sebacic, adipic, pimelic, suberic, azelaic, phthalic, terephthalate and isophthalic. These acids, comparable acids and their anhydrides can also be used either singly or in combination with one another.

The polyhydric alcohols which are suitable for reaction with the aforementioned acids to form the polyester plasticizers include, among others, 2-ethylhexane-1,3 diol, propanediol-1,2, propanediol-1,3, butanediol-1,2, butanediol-1,3, butanediol-1,4, ethylene glycol, pinacol, 1,3-isobutylene glycol, hexamethylene glycol, decamethylene glycol and the like.

Among the more important commercially available polyesters suitable for plasticizing vinyl chloride resins are the high molecular weight plasticizers which are linear polyesters of aliphatic dicarboxylic acids and glycols and are identified in the Rohm and Haas publication Plasticizers "Paraplex" and "Monoplex," copyright 1954 as follows.

Paraplex G–25:
    Molecular weight _____ 8000
    Specific gravity (25° C./15° C.) _____ 1.06
    Viscosity (poises, 25° C.) _____ 1700
    Acid number (mgm. KOH/gm.) _____ 2 (max.)

Paraplex G–40:
    Molecular weight _____ 6000
    Specific gravity (25° C./15° C.) _____ 1.15
    Viscosity (poises, 25° C.) _____ 2700
    Acid number (mgm. KOH/gm.) _____ 2 (max.)

Paraplex G–50:
    Molecular weight _____ 2200
    Specific gravity (25° C./15° C.) _____ 1.08
    Viscosity (poises, 25° C.) _____ 23
    Acid number (mgm. KOH/gm.) _____ 2 (max.)

Paraplex G–53:
    Molecular weight _____ 3380
    Specific gravity (25° C./15° C.) _____ 1.10
    Viscosity (poises, 25° C.) _____ 60
    Acid number (mgm. KOH/gm.) _____ 2 (max.)

Paraplex G–25 is further identified as a 1,2-propylene glycol sebacate polyester in a book by Arthur K. Doolittle, at page 1013, Technology of Solvents and Plasticizers, published by John Wiley & Sons.

Polyesters can be made by well-known methods such as disclosed in U.S. Patent 2,071,251 to Wallace H. Carothers Usually the polymeric type plasticizers cannot be used as the sole plasticizing agent because of their generally inadequate solvating action It is, therefore, customary to use the polymeric type plasticizers in combination with monomeric type plasticizers wherein the polymeric plasticizer is present in concentrations up to about 50 percent by weight based on the total weight of plasticizer content. In addition, plasticizer extenders can also be added if so desired, in amounts such that the total content of polymeric plasticizer and plasticizer extender does not exceed about 50 percent by weight based on the total weight of the plasticizer content. A plasticizer extender is a compound which is itself a plasticizer but is not compatible in large amounts with the resin composition to which it is added. It is used as an economic measure to decrease the amount of relatively more expensive plasticizers, such as polyesters and monomeric esters, in resin compositions.

Illustrative of a plasticizer extender is the following: chlorinated paraffin, containing about 40 percent by weight chlorine, which is marketed under the trade name "Halowaxes."

Plasticizers and plasticizer extenders can be used singly or in combination of two or more.

Among the inert, finely-divided, inorganic fillers and mixtures thereof which can be added, if desired, to the vinyl chloride resin compositions of the present invention include among others, the following: silica; silicates such as calcium silicate, magnesium silicate and the like; calcined and uncalcined clays; alkaline earth carbonates such as calcium carbonate, barium carbonate, strontium carbonate and the like; alkaline earth sulfates such as calcium sulfate, strontium sulfate, barium sulfate and the like; fibrous and ground asbestos; also mica, talc, glass fibers, carbon black, aluminum hydrate, wood flour, finely-divided cork and the like.

Other materials such as pigments, i.e. titanium dioxide; dyes such as tartrazine; lubricants such as stearic acid and flame retardants such as antimony oxide can be added to the compositions of the present invention, if so desired, in amounts such that the desirable characteristics and properties, i.e. residual indentation, McBurney indentation and total roll-separating force of the compositions, are not materially affected.

The vinyl chloride resin compositions of this invention can be thoroughly admixed and compounded by employing any one of the known mixing techniques for compounding thermoplastic compositions. For example, the admixing and compounding can be satisfactorily accomplished, at suitable temperatures in a Banbury mixer, or other such suitable apparatus.

In processing the vinyl chloride resin compositions into finished flat surface coverings by passing the compositions through calender rolls, the temperature of the calender rolls is kept within a temperature range of about 60° to about 100° C. Calender roll temperatures in excess of about 100° C. effect an entrapment of air in the finished sheet material. The entrapment of air in the finished sheet material results in a product which has poor surface characteristics manifested by poor gloss, and an uneven bumpy surface. Temperatures lower than about 60° C. result in a surface covering having an undesirable rough finish. For optimum results, temperatures of from about 70° to about 80° C. are preferred. The thickness of the surface covering can be varied as desired by adjusting the space between the calender rolls. Generally, the thickness of the finished surface covering will vary from about 0.025 to about 0.125 inch.

The following examples further illustrate the present invention and are not intended to limit the scope thereof in any manner. The amounts are in percent by weight. The surface coverings produced were of particular use as vinyl tile floor coverings.

*Example I*

Formulation: Amount
  Vinyl chloride-vinyl acetate copolymer having a vinyl chloride content of 94.4% and a specific viscosity of 0.108 _____ 29.4
  Dioctyl-phthalate (plasticizer) _____ 10.6
  Pentaerythritol _____ 2.0
  Asbestos shorts _____ 21.0
  Calcium carbonate (filler having a mesh of less than 325) _____ 26.75
  Titanium dioxide (pigment) _____ 10
  Stearic acid (lubricant) _____ 0.25

The formulation was compounded and fluxed in a Banbury mixer for 0.1 hr. The mixture was then discharged from the Banbury at a temperature of about 140° C. and was processed into a sheet material on a two-roll mill. The temperature of the front roll was 105° C.; the temperature of the back roll was 70° C.

A small amount of a cold, granular stock having the same basic composition as the sheet material but being green in color, imparted thereto by a small amount of chromic oxide, was slowly added to the sheet which was banded about the front roll of the mill. About 5 percent by weight of granular stock based on the total weight of the finished sheet material was added thereby imparting a mottled green effect to the finished sheet. The mottled sheet was stripped off the mill roll, rolled up and fed into a two-roll horizontal calender.

The mottled sheet was calendered to about 0.09 inch which was about 0.01 inch thicker than the desired final thickness. The temperature of each calender roll was 70° C. The sheet was reduced to its final thickness of about 0.08 inch by passing it through a pair of compacting rolls. The temperature of the compacting rolls was about 60° C.

The total roll-separating force of the above-identified composition when tested as described above was below 9000 lbs. which indicates that the composition is suitable for processing in apparatus designed for the manufacture of linoleum. The surface covering produced had excellent properties as indicated by the tabulated data below.

Properties:
  McBurney indentation in mils (F.S.L–T–751)—
    After 1 minute_____ 17.6
    After 10 minutes_____ 20.5
  Residual indentation in percent (F.S.L–T–751) _____ 4
  Total roll-separating force in lbs_____ 8180
  Surface smoothness and gloss of calendered sheet _____ Excellent

*Example II*

Compositions whose formulations are shown in the table that follows were processed into flat surface coverings by the method described in Example I. Compositions and the sheet material produced therefrom were subjected to tests previously described. Properties of the compositions and surface coverings made therefrom were excellent as indicated by the tabulated data.

| Formulation | Amount | | | | | | | |
|---|---|---|---|---|---|---|---|---|
| | 2 | 3 | 4 | 5 | 6 | 7 | 8 | 9 |
| Vinyl chloride-vinyl acetate copolymer having a vinyl chloride content of 94.4% and a specific viscosity of 0.108 | | 17.6 | | | | | | |
| Vinyl chloride-vinyl acetate copolymer having a vinyl chloride content of V93.9% and a specific viscosity of 0.105 | 29.4 | | | | | | | |
| Vinyl chloride-vinyl acetate copolymer having a vinyl chloride content of 86.6% and a specific viscosity of 0.098 | | | | 21.2 | | | 14.5 | 21.0 |
| Vinyl chloride-vinyl acetate copolymer having a vinyl chloride content of 89.1% and a specific viscosity of 0.141 | | | 3.0 | 1.1 | 4.3 | 10.2 | 14.5 | 7.0 |
| Vinyl chloride-vinyl acetate copolymer having a vinyl chloride content of 87.1% and a specific viscosity of 0.107 | | 11.8 | 14.2 | | 19.4 | 14.3 | | |
| Vinyl chloride homopolymer having a specific viscosity of 0.117 | | | 11.7 | 7.3 | 5.7 | 4.7 | | |
| Composite Resin: | | | | | | | | |
| Percent vinyl chloride | | 91.5 | 92.5 | 90.0 | 90.0 | 90.0 | 88.2 | 89.0 |
| Specific viscosity | | 0.107 | 0.114 | 0.105 | 0.114 | 0.122 | 0.121 | 0.137 |
| Dioctylphthalate | 10.6 | 10.6 | 11.1 | 10.4 | 10.6 | 10.8 | 11.0 | 12.0 |
| Pentaerythritol | 2.0 | 2.0 | 2.0 | 2.0 | 2.0 | 2.0 | 2.0 | 2.0 |
| Asbestos shorts | 21.0 | 21.0 | 21.0 | 21.0 | 21.0 | 21.0 | 21.0 | 21.0 |
| Calcium carbonate | 26.75 | 26.75 | 26.75 | 26.75 | 26.75 | 26.75 | 26.75 | 26.75 |
| Titanium dioxide | 10.0 | 10.0 | 10.0 | 10.0 | 10.0 | 10.0 | 10.0 | 10.0 |
| Stearic acid | 0.25 | 0.25 | 0.25 | 0.25 | 0.25 | 0.25 | 0.25 | 0.25 |

| PROPERTIES | | | | | | | | |
|---|---|---|---|---|---|---|---|---|
| McBurney indentation in mils (F.S.L-T-751): | | | | | | | | |
| After 1 minute | 16.1 | 17 | 18.5 | 18.0 | 18.3 | 17.3 | 20.0 | 21.5 |
| After 10 minutes | 18.1 | 19.8 | 22.5 | 22.6 | 22.7 | 21.7 | 24.6 | 25.3 |
| Residual Indentation in percent (F.S.L-T-751) | 5.7 | 6.7 | 6.6 | 7.7 | 6.6 | 5.8 | 6.6 | 6.4 |
| Total roll-separating force in lbs | 8,000 | 8,080 | 8,180 | 8,100 | 8,430 | 8,400 | 8,230 | 8,300 |
| Surface smoothness and gloss of calendered sheet | (¹) | (¹) | (¹) | (¹) | (¹) | (¹) | (¹) | (¹) |

¹ Excellent.

Example III

This example shows that the filler content of compositions of this invention can be varied without detrimentally affecting the properties of either the compositions or the surface coverings made therefrom.

Compositions whose formulations are shown in the table below were processed into flat surface coverings in the manner described in Example I. Compositions and flat sheet material produced therefrom were subjected to tests previously described.

| Formulation | Amount | |
|---|---|---|
| Vinyl chloride-vinyl acetate having a vinyl chloride content of 94.4% and a specific viscosity of 0.108 | 22.1 | 25.7 |
| Dioctylphthalate | 9.9 | 10.3 |
| Pentaerythritol | 2.0 | 2.0 |
| Asbestos shorts | 24.0 | 22.4 |
| Calcium carbonate | 36.0 | 33.6 |
| Titanium dioxide | 5.75 | 5.75 |
| Stearic acid | 0.25 | 0.25 |

| PROPERTIES | | |
|---|---|---|
| McBurney Indentation in mils (F.S.L-T-751): | | |
| After 1 minute | 17.7 | 16.8 |
| After 10 minutes | 20.7 | 19.6 |
| Residual Indentation in percent (F.S.L-T-751) | 6.3 | 5.9 |
| Total roll-separating force in lbs | 8,710 | 8,140 |
| Surface smoothness and gloss of calendered sheet | (¹) | (¹) |

¹ Excellent.

Example IV

The composition of this example whose formulation is shown below had a total roll-separating force of 8190 lbs. This composition was, therefore, suitable for being processed into a flat surface covering in linoleum calenders.

| Formulation: | Amount |
|---|---|
| Vinyl chloride-vinyl acetate copolymer having a vinyl chloride content of 94.4% and a specific viscosity of 0.108 | 38.5 |
| Dioctylphthalate | 11.5 |
| Pentaerythritol | 2.0 |
| Asbestos shorts | 16.8 |
| Calcium carbonate | 25.2 |
| Titanium dioxide | 5.75 |
| Stearic acid | 0.25 |

Example V

In this example a dipropylene glycol dibenzoate was used as the plasticizer in lieu of the dioctyl phthalate. The composition whose formulation is shown below was processed into a flat-surface covering in a manner described in Example I.

| Formulation: | Amount |
|---|---|
| Vinyl chloride-vinyl acetate copolymer having a vinyl chloride content of 86.6% and a specific viscosity of 0.098 | 11.5 |
| Vinyl chloride-vinyl acetate copolymer having a vinyl chloride content of 89.1% and a specific viscosity of 0.141 | 16.5 |
| Dipropylene glycol dibenzoate | 12.0 |
| Pentaerythritol | 2.0 |
| Asbestos shorts | 21.0 |
| Calcium carbonate | 26.75 |
| Titanium dioxide | 10.0 |
| Stearic acid | 0.25 |
| Composite resin— | |
| Percent vinyl chloride | 88.4 |
| Specific viscosity | 0.124 |

Properties:
| | |
|---|---|
| McBurney Indentation in mils (F.S. L-T-751)— | |
| After 1 minute | 18.2 |
| After 10 minutes | 24.2 |
| Residual indentation in percent (F.S. L-T-751) | 7.9 |

| Properties: | Amount |
|---|---|
| Total roll-separating force in lbs. | 8670 |
| Surface smoothness and gloss of calendered sheet | Excellent |

Surface coverings made from compositions of this invention, as illustrated by the foregoing examples, do not require any post-calendering, press planishing operations as their surface characteristics are excellent.

The compositions of the present invention can be processed into surface coverings for floors, tables, walls and the like. Flat sheet material produced can also be laminated to materials such as felt to produce excellent surface coverings.

What is claimed is:

1. A composition comprising from about 15 to about 70 percent by weight of a vinyl chloride resin selected from the group consisting of vinyl chloride homopolymers, vinyl chloride-vinyl acetate copolymers and mixtures thereof wherein the vinyl chloride resin has a vinyl chloride content polymerized therein of at least about 86 percent by weight and a specific viscosity of from about 0.098 to about 0.141, from about 10 to about 30 percent by weight of a plasticizer, from about 0.2 to about 5 percent by weight of a stabilizer, and from 0 to about 75 percent by weight of an inorganic filler wherein the components are present in amounts such that the composition has a total roll-separating force of less than about 9000 lbs. and a residual indentation of less than about 10.5 percent.

2. A composition of claim 1 wherein the plasticizer is dioctyl phthalate.

3. A composition of claim 1 wherein the plasticizer is dipropylene glycol dibenzoate.

4. A composition of claim 1 wherein the vinyl chloride-vinyl chloride resin is a vinyl chloride-vinyl acetate copolymer which has a vinyl chloride content polymerized therein of about 94.4 percent by weight and a specific viscosity of about 0.108.

5. A composition of claim 1 wherein the vinyl chloride resin is a vinyl chloride-vinyl acetate copolymer which has a vinyl chloride content polymerized therein of about 93.9 percent by weight and a specific viscosity of about 0.105.

6. A composition of claim 1 wherein the vinyl chloride resin has a vinyl chloride content polymerized therein of from about 88 to about 96 percent and a specific viscosity of from about 0.098 to about 0.151.

7. A composition of claim 1 comprising from about 20 to about 40 percent by weight of a vinyl chloride resin selected from the group consisting of vinyl chloride homopolymers, vinyl chloride-vinyl acetate copolymers and mixtures thereof wherein the vinyl chloride resin has a vinyl chloride content polymerized therein of at least about 86 percent by weight and a specific viscosity of from about 0.098 to about 0.141; from about 10 to about 15 percent by weight of a plasticizer; from about 0.5 to about 2 percent by weight of a stabilizer, and from about 45 to about 70 percent by weight of an inorganic filler.

8. A composition of claim 7 wherein the vinyl chloride resin has a vinyl chloride content polymerized therein of from about 88 to about 96 percent by weight and a specific viscosity of from about 0.098 to about 0.141.

9. Method of producing resilient, flexible, smooth surface coverings which comprises passing a vinyl chloride resin composition through two calender rolls maintained at a temperature from about 60° to about 100° C. wherein the vinyl chloride resin composition has the following formulation: from about 15 to about 70 percent by weight vinyl chloride resin selected from the group consisting of vinyl chloride homopolymers, vinyl chloride-vinyl acetate copolymers and mixtures thereof wherein the vinyl chloride content polymerized therein is at least about 86 percent by weight and the specific viscosity of said resin is from about 0.098 to about 0.141, from about 10 to about 30 percent by weight of a plasticizer, from about 0.2 to about 5 percent by weight of a stabilizer and from about 0 to about 75 percent by weight of an inorganic filler, wherein the components are present in amounts such that the composition has a total roll-separating force of less than about 9000 lbs. and a residual indentation of less than about 10.5 percent.

10. Method of claim 9 wherein the temperature of the calender rolls is from about 70° to about 80° C.

References Cited in the file of this patent
UNITED STATES PATENTS

| 2,695,279 | Kahn et al. | Nov. 23, 1954 |
| 2,789,101 | Wilson | Apr. 16, 1957 |
| 2,838,428 | Bohrer | June 10, 1958 |
| 2,897,176 | Rocky et al. | July 28, 1959 |
| 2,917,472 | Smith | Dec. 15, 1959 |

UNITED STATES PATENT OFFICE
CERTIFICATE OF CORRECTION

Patent No. 3,091,597　　　　　　　　　　　　　　May 28, 1963

Harry P. Henriques III

It is hereby certified that error appears in the above numbered patent requiring correction and that the said Letters Patent should read as corrected below.

Column 2, line 33, for "nitrobenezne" read -- nitrobenzene --; column 3, line 60, for "surfec" read -- surface --; column 6, line 20, for "methl" read -- methyl --; columns 9 and 10, in the table, first column, line 6 thereof, for "V93.9%" read -- 93.9% --; same table, first column, line 7 thereof, for "inyl" read -- Vinyl --; column 11, line 34, strike out "vinyl chloride-"; line 48, for "0.151" read -- 0.141 --; column 12, line 32, for "percen" read -- percent --.

Signed and sealed this 11th day of February 1964.

(SEAL)
Attest:

ERNEST W. SWIDER　　　　　　　　　　　　　　EDWIN L. REYNOLDS
Attesting Officer　　　　　　　　　　　　　　Acting Commissioner of Patents

UNITED STATES PATENT OFFICE
CERTIFICATE OF CORRECTION

Patent No. 3,091,597                          May 28, 1963

Harry P. Henriques III

It is hereby certified that error appears in the above numbered patent requiring correction and that the said Letters Patent should read as corrected below.

Column 2, line 33, for "nitrobenezne" read -- nitrobenzene --; column 3, line 60, for "surfec" read -- surface --; column 6, line 20, for "methl" read -- methyl --; columns 9 and 10, in the table, first column, line 6 thereof, for "V93.9%" read -- 93.9% --; same table, first column, line 7 thereof, for "inyl" read -- Vinyl --; column 11, line 34, strike out "vinyl chloride-"; line 48, for "0.151" read -- 0.141 --; column 12, line 32, for "percen" read -- percent --.

Signed and sealed this 11th day of February 1964.

(SEAL)
Attest:

ERNEST W. SWIDER                              EDWIN L. REYNOLDS

Attesting Officer                            Acting Commissioner of Patents